(12) United States Patent
Huang (10) Patent No.: US 11,774,163 B2
(45) Date of Patent: Oct. 3, 2023

(54) INTEGRALLY-FORMED LIQUID COLLECTING BOX STRUCTURE AND METHOD FOR MANUFACTURING THE SAME

(71) Applicant: Huizhou Hanxu Hardware Plastic Technology Co., Ltd., Guangdong (CN)

(72) Inventor: Tsung-Hsien Huang, Guangdong (CN)

(73) Assignee: HUIZHOU HANXU HARDWARE PLASTIC TECHNOLOGY CO., LTD., Guangdong (CN)

(*) Notice: Subject to any disclaimer, the term of this patent is extended or adjusted under 35 U.S.C. 154(b) by 184 days.

(21) Appl. No.: 17/367,429

(22) Filed: Jul. 5, 2021

(65) Prior Publication Data

US 2022/0333844 A1 Oct. 20, 2022

(30) Foreign Application Priority Data

Apr. 15, 2021 (CN) ............ 202110406026.6

(51) Int. Cl.
*F25D 21/14* (2006.01)
*F16N 31/00* (2006.01)

(52) U.S. Cl.
CPC .......... *F25D 21/14* (2013.01); *F16N 31/002* (2013.01)

(58) Field of Classification Search
CPC ............ B65D 41/0407; B65D 41/0435; B65D 41/06; B65D 41/04; B65D 11/08; B65D 25/005; B65D 81/261; B65D 90/24; F25D 21/14; F16N 31/002
USPC ....... 220/601, 661, 571, 295, 293, 304, 288; 141/86
See application file for complete search history.

(56) References Cited

U.S. PATENT DOCUMENTS

2021/0372418 A1* 12/2021 Dedrick .............. F16L 55/1141

* cited by examiner

*Primary Examiner* — Robert J Hicks
(74) *Attorney, Agent, or Firm* — Leong C. Lei (57) ABSTRACT

An integrally-formed liquid collecting box structure and a method for manufacturing the same are presented. The integrally-formed liquid collecting box structure includes an integrally-formed liquid collecting box, a screw, and a leak-proof sealing ring. The leak-proof sealing ring is located between a nut portion of the screw and an inner end face of a stepped hole. The screw is screwed into an internal threaded hole. When the screw is tightened, the nut portion squeezes the leak-proof sealing ring so that the leak-proof sealing ring is deformed and clamped between the nut portion and the inner end face of the stepped hole, so as to prevent leakage.

9 Claims, 13 Drawing Sheets

INTEGRALLY-FORMED LIQUID COLLECTING BOX STRUCTURE AND METHOD FOR MANUFACTURING THE SAME

BACKGROUND OF THE INVENTION

1. Field of the Invention

The present invention relates to a radiator, and more particularly to an integrally-formed liquid collecting box structure and a method for manufacturing the same.

2. Description of the Prior Art

A conventional liquid-cooling radiator assembly usually consists of a liquid-cooling radiator, a liquid-cooling block and a liquid tube. The liquid tube is connected between the liquid-cooling radiator and the liquid-cooling block. The liquid tube is configured to circulate the liquid in the liquid-cooling radiator and the liquid-cooling block. After the liquid absorbs heat of the liquid-cooling block, it flows into the liquid-cooling radiator to dissipate heat. The liquid after heat dissipation flows back into the liquid-cooling block. In the prior art, the liquid injection port of the liquid collecting box and the liquid collecting box of the liquid-cooling radiator are designed and manufactured separately. The liquid collecting box is formed with a mounting hole, and then the liquid injection port of the liquid collecting box is welded to the mounting hole of the liquid collecting box. There are many shortcomings in this structure, for example, (1) the liquid injection port of the liquid collecting box is welded to the mounting hole of the liquid collecting box, which may have a doubt about liquid leakage; (2) the two parts need to be made separately and then assembled by welding, which is troublesome, time-consuming, limited in production efficiency and not beneficial for controlling production costs; (3) the liquid injection port of the liquid collecting box is protrudingly exposed on the outside of the liquid collecting box, which occupies the outer space of the liquid collecting box and is not conducive to the application and arrangement of the liquid-cooling radiator.

SUMMARY OF THE INVENTION

In view of the defects of the prior art, the primary object of the present invention is to provide an integrally-formed liquid collecting box structure and a method for manufacturing the same, which solves the problem that the liquid injection port of the liquid collecting box and the liquid collecting box of the liquid-cooling radiator are designed and manufactured separately and then welded. The present invention has the advantages of leakage prevention, easy production, and compact structure.

In order to achieve the above object, the present invention adopts the following technical solutions:

An integrally-formed liquid collecting box structure comprises an integrally-formed liquid collecting box, a screw, and a leak-proof sealing ring. An inner wall surface of the liquid collecting box is integrally formed with a protruding portion having a liquid injection port. The liquid injection port includes an internal threaded hole and a stepped hole for accommodating a nut portion of the screw and the leak-proof sealing ring. The internal threaded hole communicates with an interior of the liquid collecting box. The stepped hole communicates with the internal threaded hole and an exterior of the liquid collecting box. The leak-proof sealing ring is located between the nut portion of the screw and an inner end face of the stepped hole. The screw is screwed into the internal threaded hole. When the screw is tightened, the nut portion squeezes the leak-proof sealing ring so that the leak-proof sealing ring is deformed and clamped between the nut portion and the inner end face of the stepped hole, so as to prevent leakage.

A method for manufacturing an integrally-formed liquid collecting box structure comprises the following steps of:

Step 1, an integrally-formed liquid collecting box being formed by forging or stretching, an inner wall surface of the liquid collecting box being integrally formed with a protruding portion having a liquid injection port; the liquid injection port including a through hole communicating with an interior of the liquid collecting box and a stepped hole communicating with the through hole and an exterior of the liquid collecting box;

Step 2, tapping the through hole to form an internal threaded hole;

Step 3, a screw being inserted through a leak-proof sealing ring and screwed into the internal threaded hole, wherein when the screw is tightened, a nut portion of the screw squeezes the leak-proof sealing ring so that the leak-proof sealing ring is deformed and clamped between the nut portion and an inner end face of the stepped hole, so as to prevent leakage.

Compared with the prior art, the present invention has obvious advantages and beneficial effects. Specifically, it can be known from the above technical solutions. The inner wall surface of the liquid collecting box is integrally formed with a protruding portion having a liquid injection port, which solves the problem that the liquid injection port of the liquid collecting box and the liquid collecting box of the liquid-cooling radiator are designed and manufactured separately and then welded. The present invention has the advantages of leakage prevention, easy production, and compact structure. This technical solution can be widely use.

DETAILED DESCRIPTION OF THE PREFERRED EMBODIMENTS

FIGS. 1 to 13 show the specific structure of multiple embodiments of the present invention.

An integrally-formed liquid collecting box structure comprises an integrally-formed liquid collecting box 10, a screw 40 and a leak-proof sealing ring 50. Preferably, the liquid collecting box 10 is formed by forging or stretching.

The inner wall surface of the liquid collecting box 10 is integrally formed with a protruding portion 20 having a liquid injection port 30. The liquid injection port 30 includes an internal threaded hole 31 and a stepped hole 32 for accommodating a nut portion 41 of the screw 40 and the leak-proof sealing ring 50. The internal threaded hole 31 communicates with the interior of the liquid collecting box 10. The stepped hole 32 communicates with the internal threaded hole 31 and the exterior of the liquid collecting box 10.

The leak-proof sealing ring 50 is located between the nut portion 41 of the screw 40 and the inner end face A of the stepped hole 32. The screw 40 is screwed into the internal threaded hole 31. When the screw 40 is tightened, the nut portion 41 squeezes the leak-proof sealing ring 50 so that the leak-proof sealing ring 50 is deformed and clamped between the nut portion 41 and the inner end face A of the stepped hole 32, so as to prevent leakage. The outer end face of the nut portion 41 is lower than or is flush with the outer wall surface of the liquid collecting box 10. Therefore, the problem that the liquid injection port 30 protrudes outside the liquid collecting box 10 of the prior art is solved.

Preferably, the sum of the thicknesses of the nut portion 41 and the leak-proof sealing ring 50 is greater than the depth of the stepped hole 32. In this way, there is a margin for the nut portion 41 to squeeze and deform the leak-proof sealing ring 50 to fill the stepped hole 32. In the case where the sum of the thicknesses of the nut portion 41 and the leak-proof sealing ring 50 is equal to or less than the depth of the stepped hole 32, the nut portion 41 may be lower than the outer wall surface of the liquid collecting box 10 by slightly sinking the nut portion 41 into the stepped hole 32. The deformation and sealing effect of the leak-proof sealing ring 50 can also be achieved.

As shown in FIGS. 2 to 6, the stepped hole 32 includes a first stepped hole 321 and a second stepped hole 322 that are sequentially arranged from outside to inside and communicate with each other. The first stepped hole 321 is larger than the second stepped hole 322. The leak-proof sealing ring 50 is located in the second stepped hole 322. Before the leak-proof sealing ring 50 is squeezed by the nut portion 41, the thickness of the leak-proof sealing ring 50 is higher than the first step surface B of the first stepped hole 321. When the screw 40 is tightened, the nut portion 41 squeezes the leak-proof sealing ring 50 until the nut portion 41 abuts against the first step surface B, so that the leak-proof sealing ring 50 is deformed to fill the second stepped hole 322, so as to prevent leakage.

The liquid injection port 30 is integrally formed on any side wall of the liquid collecting box 10. The liquid injection port 30 and a water tube fitting 60 on the liquid collecting box 10 are arranged on the same side or different sides of the liquid collecting box 10. For example, the liquid injection port 30 shown in FIG. 1 and the water tube fitting 60 of the liquid collecting box 10 are arranged on different sides; the liquid injection port 30 shown in FIG. 10 and the water tube fitting 60 of the liquid collecting box 10 are arranged on the same side. The liquid injection port 30 may be arranged at the left and right ends of the liquid collecting box 10. In short, except for the connecting side of the liquid collecting box 10 and the flow channel, other positions may be suitable as needed.

Figure 1:
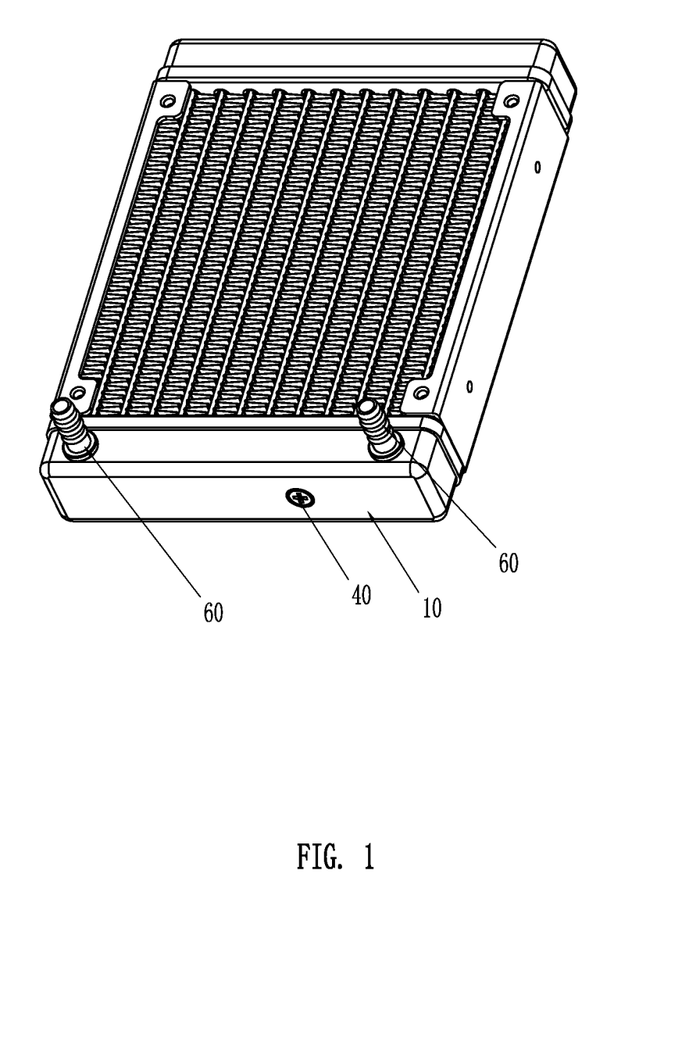
FIG. 1 is a perspective view of a first embodiment of the present invention, illustrating the liquid-cooling radiator.
Figure 2:
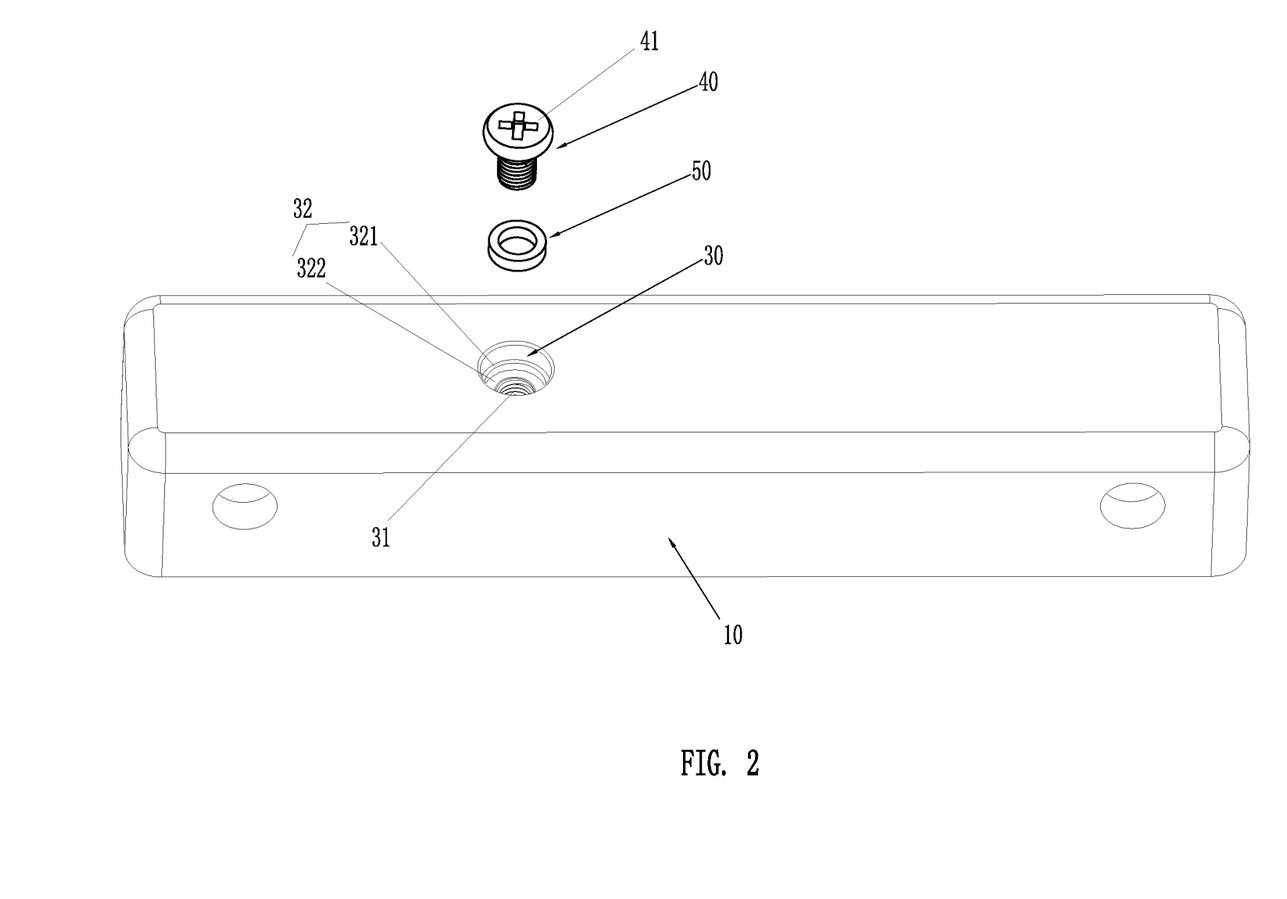
FIG. 2 is an exploded view of the liquid collecting box of the first embodiment of the present invention.
Figure 3:
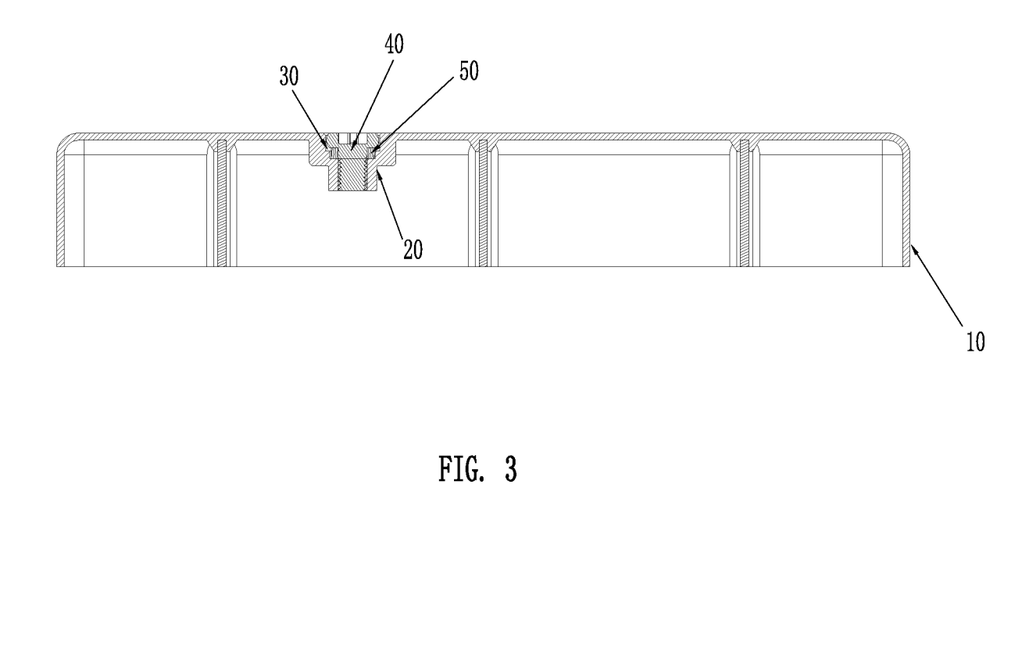
FIG. 3 is a cross-sectional view of the liquid collecting box of the first embodiment of the present invention.
Figure 4:
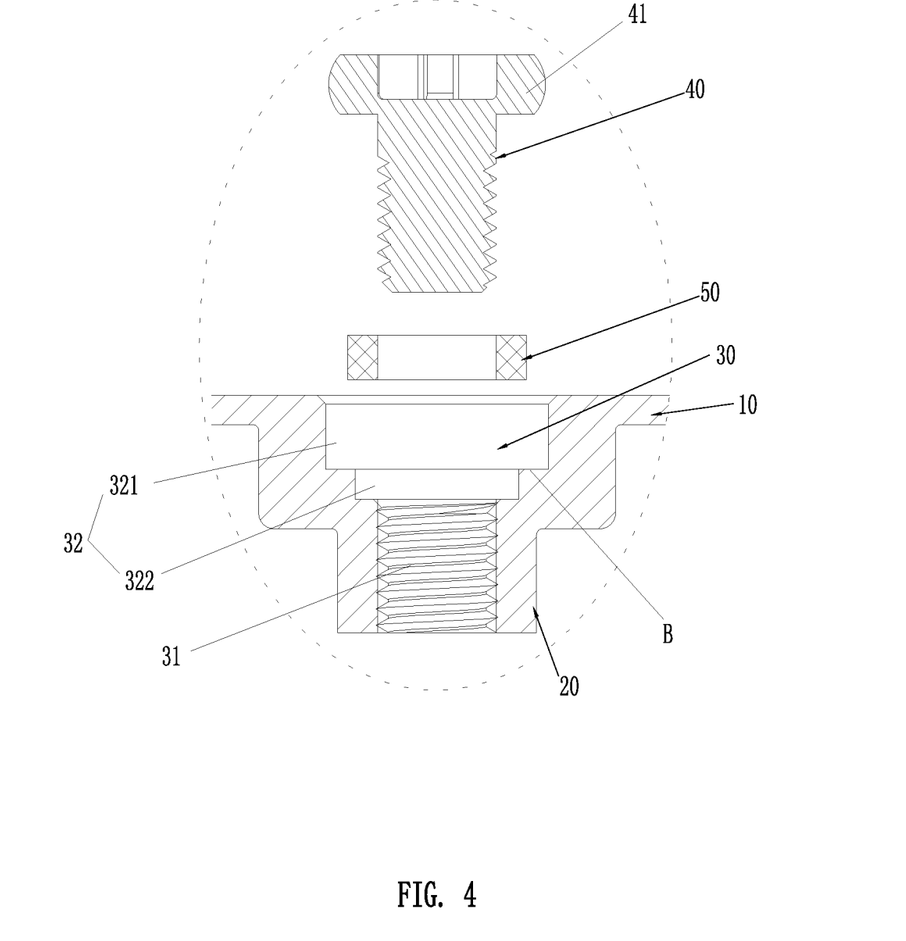
FIG. 4 is a partial cross-sectional view of the first embodiment of the present invention, wherein the screw and the leak-proof sealing ring are not installed.
Figure 5:
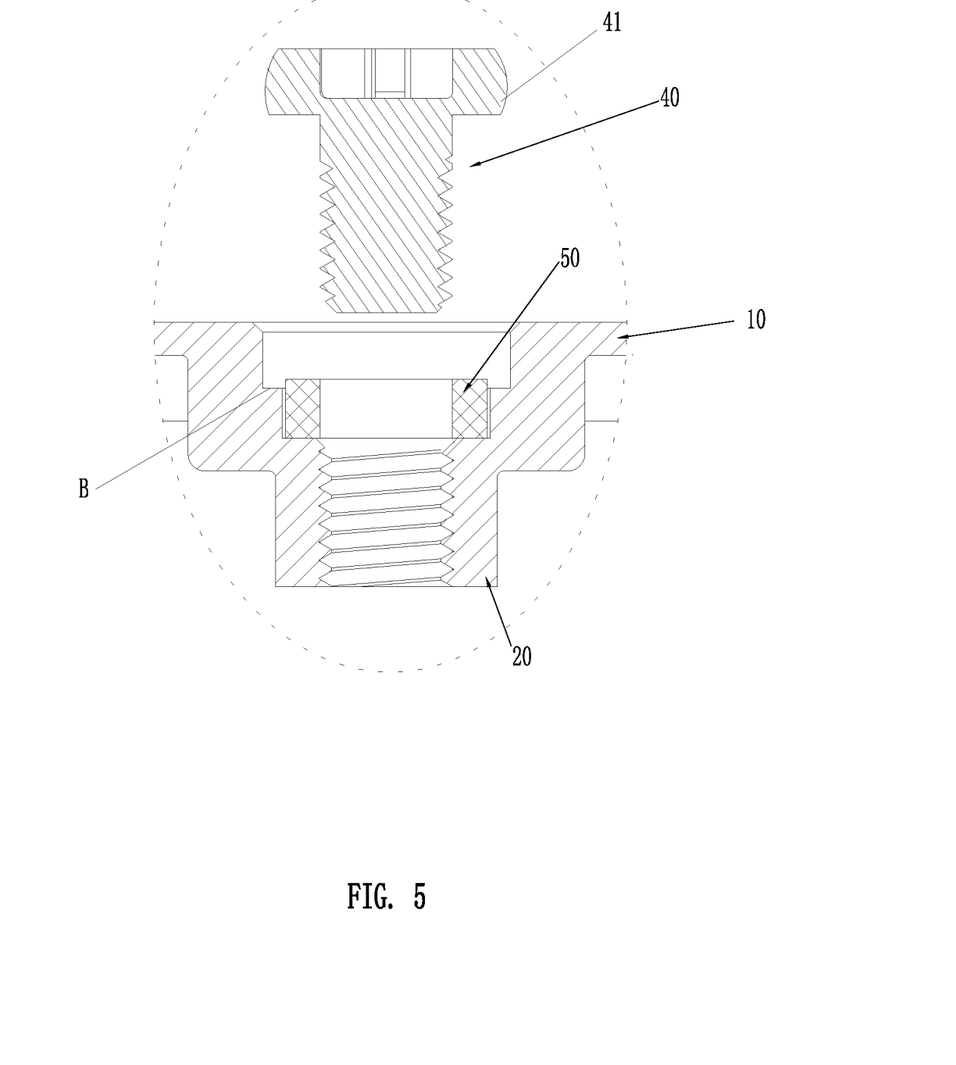
FIG. 5 is a partial cross-sectional view of the first embodiment of the present invention, illustrating that the thickness of the leak-proof sealing ring is higher than the first step surface of the first stepped hole.
Figure 6:
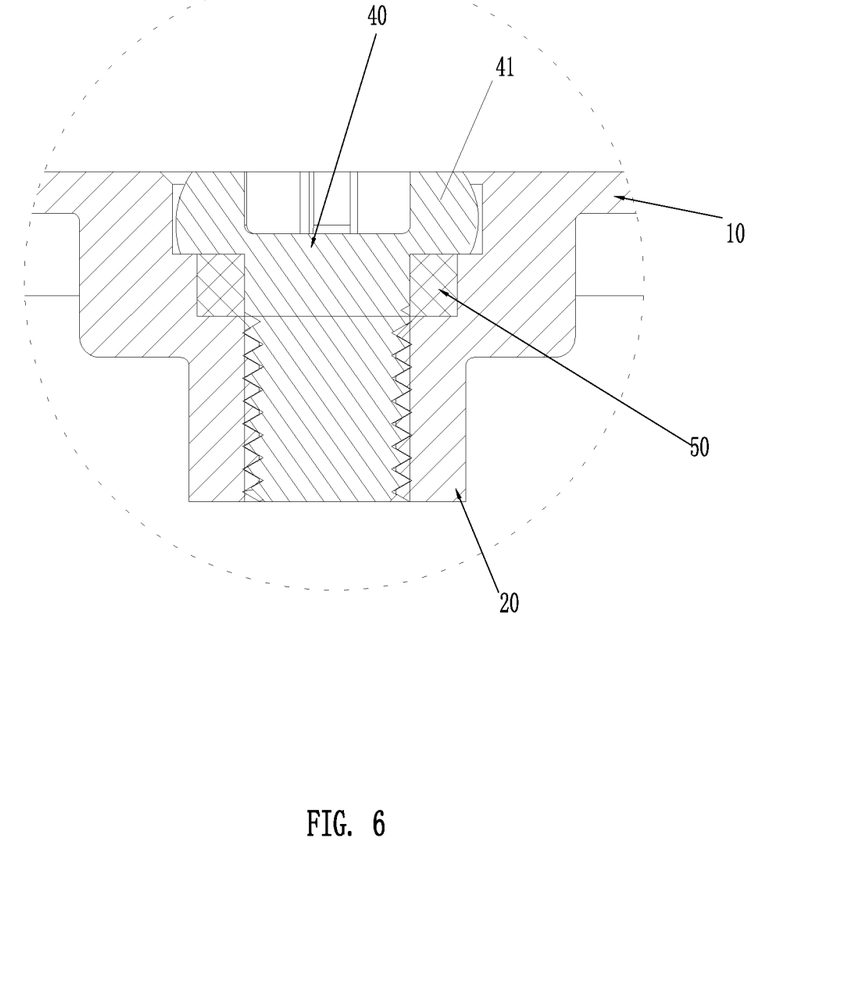
FIG. 6 is a partial cross-sectional view of the first embodiment of the present invention in a locked and anti-leak state.
Figure 7:
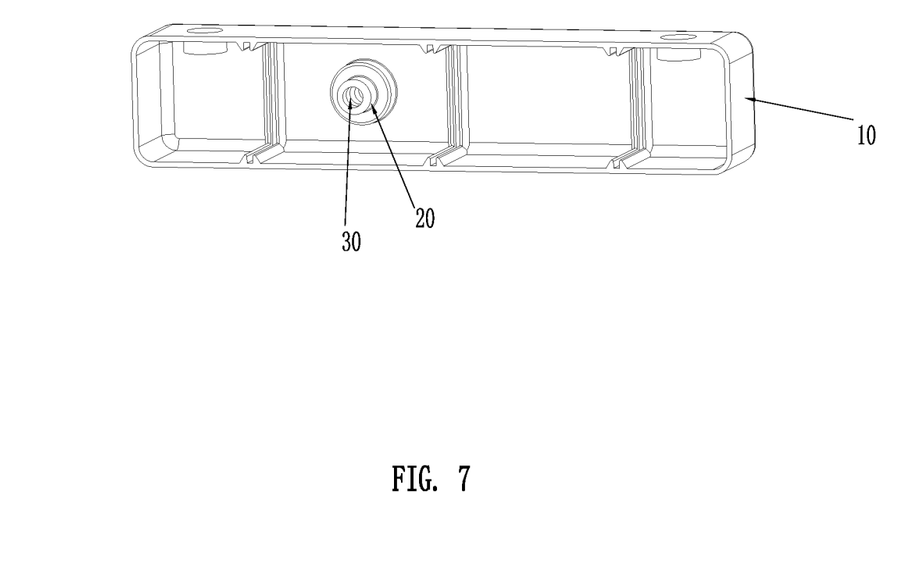
FIG. 7 is a perspective view of the first embodiment of the present invention, without the screw and the leak-proof sealing ring.
Figure 8:
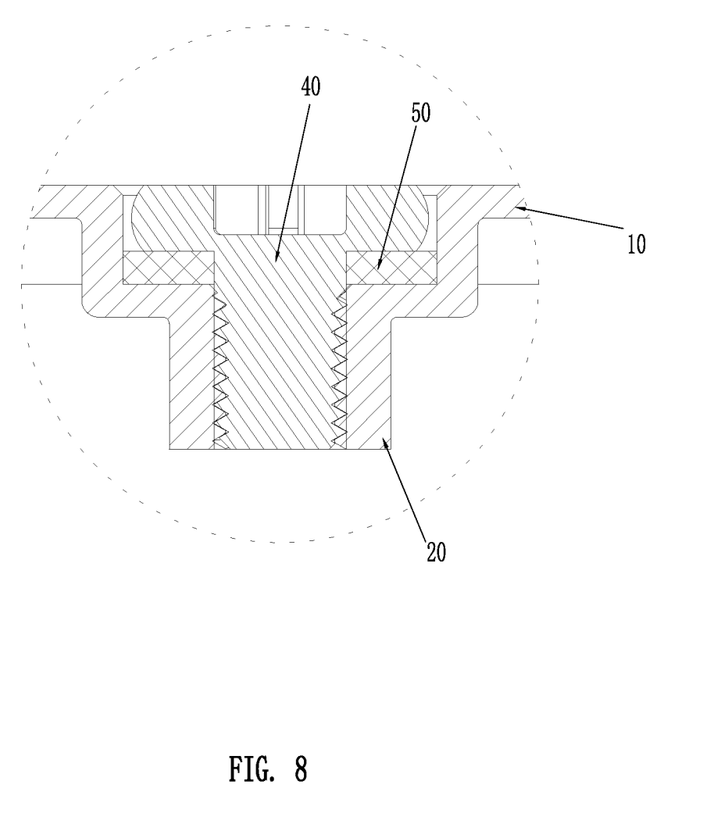
FIG. 8 is a partial cross-sectional view of the first embodiment of the present invention in a locked and anti-leak state.
Figure 9:
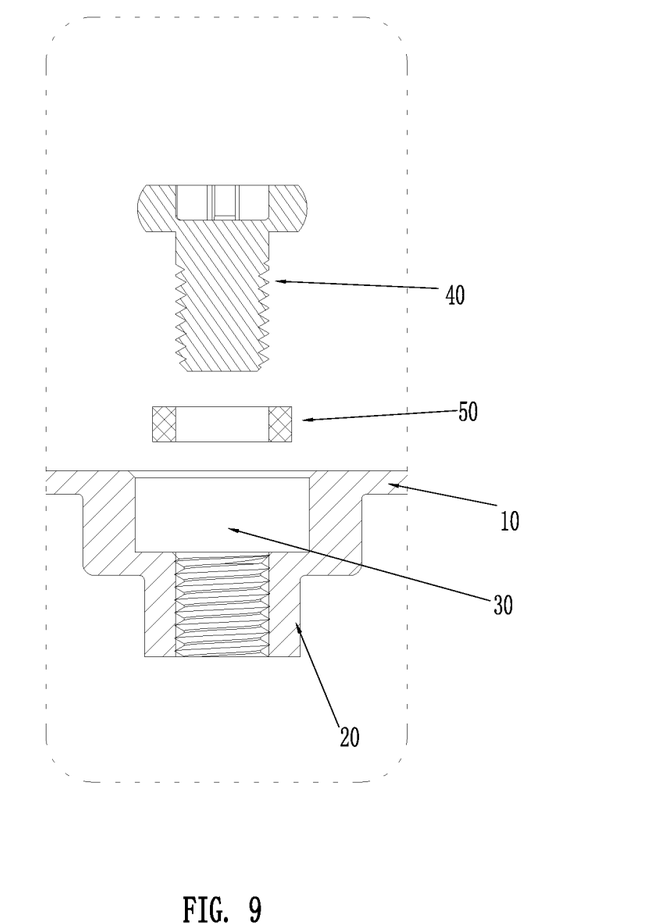
FIG. 9 is a partial cross-sectional view of a second embodiment of the present invention, wherein the screw and the leak-proof sealing ring are not installed.
Figure 10:
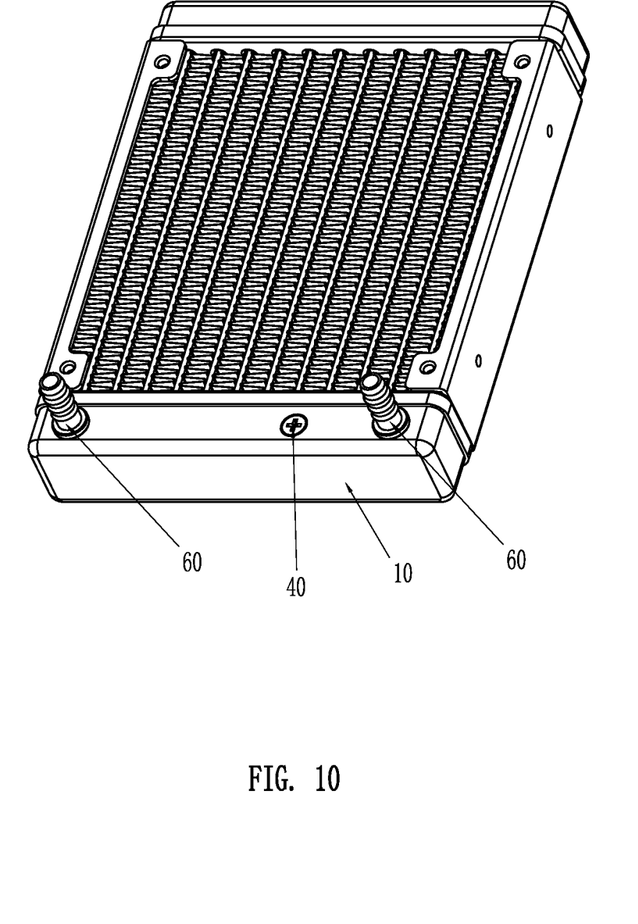
FIG. 10 is a perspective view of a third embodiment of the present invention, illustrating the liquid-cooling radiator.
Figure 11:
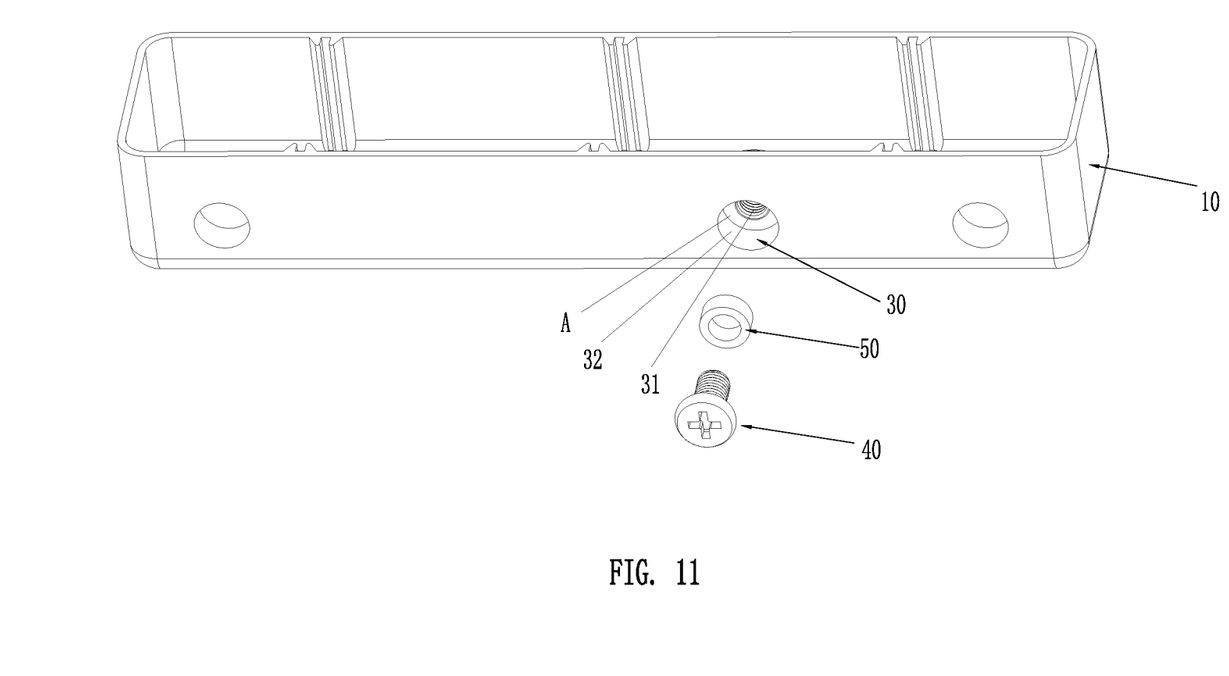
FIG. 11 is an exploded view of the liquid collecting box of the third embodiment of the present invention.
Figure 12:
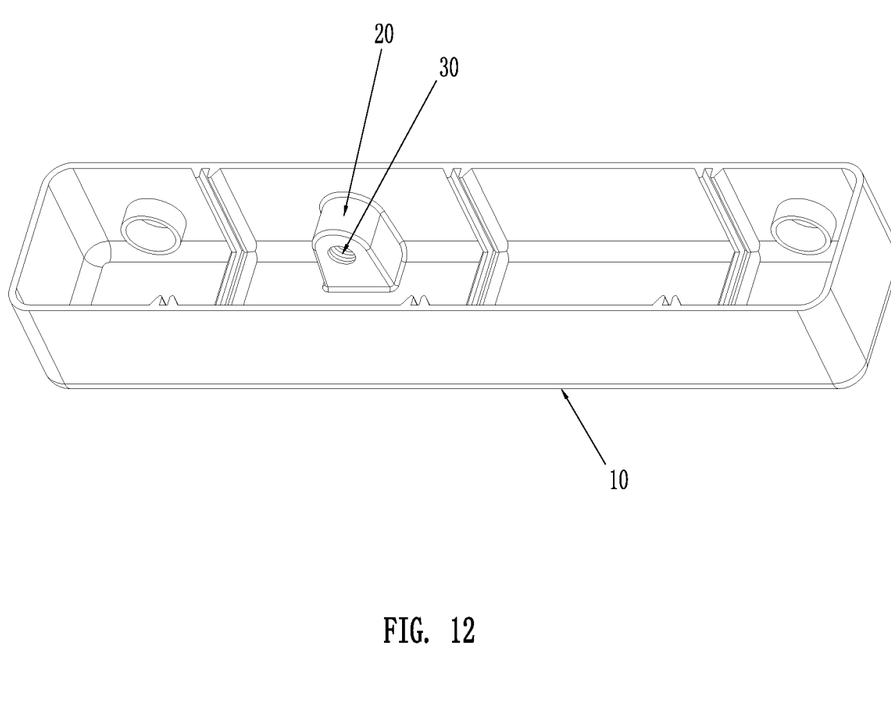
FIG. 12 is a perspective view of the third embodiment of the present invention, without the screw and the leak-proof sealing ring.
Figure 13:
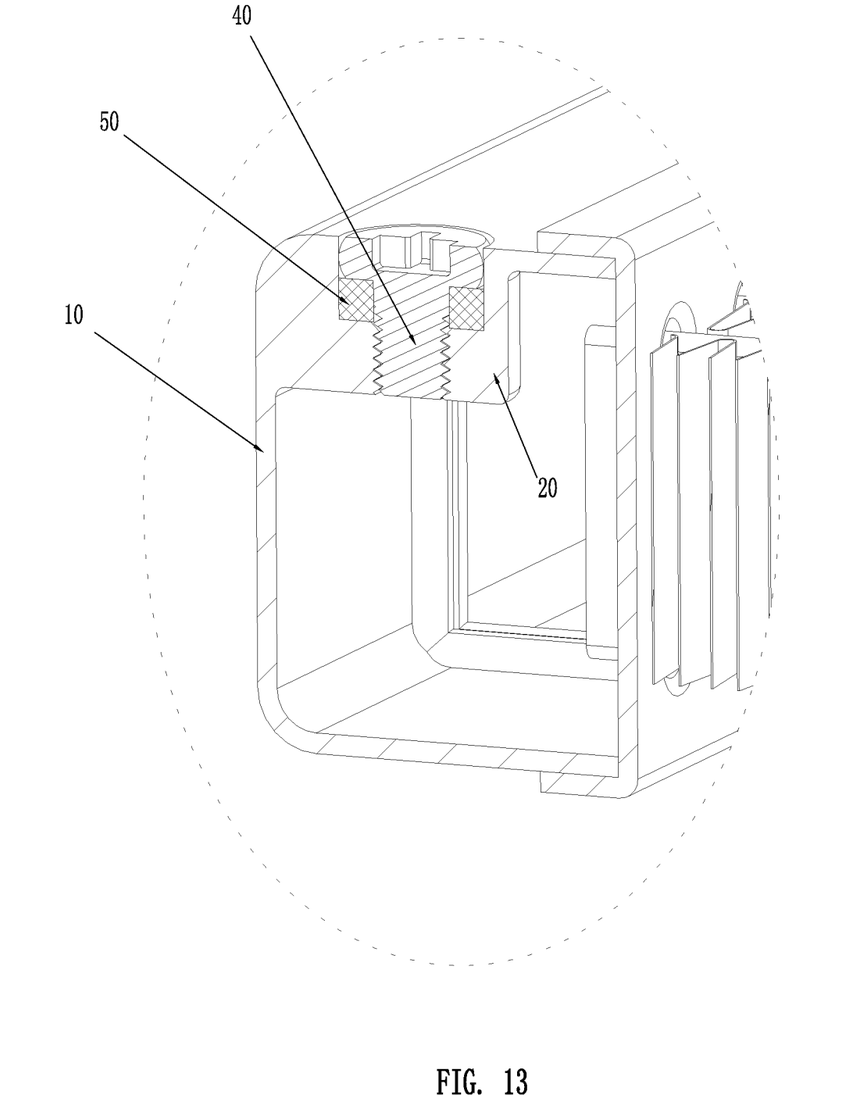
FIG. 13 is a partial cross-sectional view of the third embodiment of the present invention in a locked and anti-leak state.

Please refer to FIG. 3 and FIG. 13. The protruding portion 20 shown in FIG. 3 is designed to correspond to the shape of the liquid injection hole 30. The protruding portion 20 shown in FIG. 13 is integrally formed with the adjacent side wall, which can increase the structural strength of the protruding portion 20 and improve the durability of the liquid injection port 30 in use, disassembly and locking operations, and is not easily damaged. If the space is small, the protruding portion 20 is integrally formed with the adjacent side wall, so as to avoid a gap formed between the protruding portion 20 and the adjacent side wall. It is easily formed and manufactured.

Next, the present invention further discloses a method for manufacturing an integrally-formed liquid collecting box structure, comprising the following steps of:

Step 1, an integrally-formed liquid collecting box 10 being formed by forging or stretching, the inner wall surface of the liquid collecting box 10 being integrally formed with a protruding portion 20 having a liquid injection port 30; the liquid injection port 30 including a through hole communicating with the interior of the liquid collecting box 10 and a stepped hole 32 communicating with the through hole and the exterior of the liquid collecting box 10;

Step 2, tapping the through hole to form an internal threaded hole 31;

Step 3, a screw 40 being inserted through a leak-proof sealing ring 50 and screwed into the internal threaded hole 31. When the screw 40 is tightened, a nut portion 41 of the screw 40 squeezes the leak-proof sealing ring 50 so that the leak-proof sealing ring 50 is deformed and clamped between the nut portion 41 and the inner end face A of the stepped hole 32 to prevent leakage.

Preferably, in Step 1, the stepped hole 32 includes a first stepped hole 321 and a second stepped hole 322 that are sequentially arranged from outside to inside and communicate with each other. In Step 3, the leak-proof sealing ring 50 is located in the second stepped hole 322, and the leak-proof sealing ring 50 is higher than the first step surface B of the first stepped hole 321. When the screw 40 is tightened, the nut portion 41 squeezes the leak-proof sealing ring 50 until the nut portion 41 abuts against the first step surface B (The first step surface here is equivalent to the inner end face A of the stepped hole), so that the leak-proof sealing ring 50 is deformed to fill the second stepped hole 322, so as to prevent leakage.

It should be noted that the liquid collecting box is preferably made of a heat-dissipating metal material. For example, it may be made of stainless aluminum, iron, or stainless steel.

What is claimed is:

1. An integrally-formed liquid collecting box structure, comprising an integrally-formed liquid collecting box, a screw and a leak-proof sealing ring; an inner wall surface of the liquid collecting box being integrally formed with a protruding portion having a liquid injection port; the liquid injection port including an internal threaded hole and a stepped hole for accommodating a nut portion of the screw and the leak-proof sealing ring, the internal threaded hole communicating with an interior of the liquid collecting box, the stepped hole communicating with the internal threaded hole and an exterior of the liquid collecting box;

the leak-proof sealing ring being located between the nut portion of the screw and an inner end face of the stepped hole, the screw being screwed into the internal threaded hole, wherein when the screw is tightened, the nut portion squeezes the leak-proof sealing ring so that the leak-proof sealing ring is deformed and clamped between the nut portion and the inner end face of the stepped hole, so as to prevent leakage.

2. The integrally-formed liquid collecting box structure as claimed in claim 1, wherein the stepped hole includes a first stepped hole and a second stepped hole that are sequentially arranged from outside to inside and communicate with each other, the first stepped hole is larger than the second stepped hole; the leak-proof sealing ring is located in the second stepped hole, before the leak-proof sealing ring is squeezed by the nut portion, the leak-proof sealing ring has a thickness greater than a first step surface of the first stepped hole, when the screw is tightened, the nut portion squeezes the leak-proof sealing ring until the nut portion abuts against the first step surface, so that the leak-proof sealing ring is deformed to fill the second stepped hole, so as to prevent leakage.

3. The integrally-formed liquid collecting box structure as claimed in claim 1, wherein the liquid collecting box is formed by forging or stretching.

4. The integrally-formed liquid collecting box structure as claimed in claim 1, wherein the liquid injection port is integrally formed on any side wall of the liquid collecting box.

5. The integrally-formed liquid collecting box structure as claimed in claim 1, wherein the liquid injection port and a water tube fitting on the liquid collecting box are arranged on a same side or different sides of the liquid collecting box.

6. The integrally-formed liquid collecting box structure as claimed in claim 1, wherein a sum of thicknesses of the nut portion and the leak-proof sealing ring is greater than a depth of the stepped hole.

7. The integrally-formed liquid collecting box structure as claimed in claim 1, wherein an outer end face of the nut portion is lower than or flush with an outer wall surface of the liquid collecting box.

8. A method for manufacturing an integrally-formed liquid collecting box structure, comprising the following steps of:

step 1, an integrally-formed liquid collecting box being formed by forging or stretching, an inner wall surface of the liquid collecting box being integrally formed with a protruding portion having a liquid injection port; the liquid injection port including a through hole communicating with an interior of the liquid collecting box and a stepped hole communicating with the through hole and an exterior of the liquid collecting box;

step 2, tapping the through hole to form an internal threaded hole;

step 3, a screw being inserted through a leak-proof sealing ring and screwed into the internal threaded hole, wherein when the screw is tightened, a nut portion of the screw squeezes the leak-proof sealing ring so that the leak-proof sealing ring is deformed and clamped between the nut portion and an inner end face of the stepped hole, so as to prevent leakage.

9. The method as claimed in claim 8, wherein in step 1, the stepped hole includes a first stepped hole and a second stepped hole that are sequentially arranged from outside to inside and communicate with each other; in step 3, the leak-proof sealing ring is located in the second stepped hole and the leak-proof sealing ring is higher than a first step surface of the first stepped hole, when the screw is tightened, the nut portion squeezes the leak-proof sealing ring until the nut portion abuts against the first step surface, so that the leak-proof sealing ring is deformed to fill the second stepped hole, so as to prevent leakage.

* * * * *